UNITED STATES PATENT OFFICE 2,364,035

MODIFIED SOYBEAN PROTEIN FIBER

Oskar Huppert, Newark, N. J.

No Drawing. Application February 27, 1943,
Serial No. 477,470

1 Claim. (Cl. 260—7)

This application is a continuation-in-part of copending application, Serial No. 473,141, filed on Jan. 21, 1943.

In the said application a group of thermoplastic products of high molecular weight, manufactured by co-polymerization of pseudo-thiohydantoin-protein and phenolic substances with aldehydes, has been described.

The present application deals with the same general object, but concerns itself primarily with improvements in the manufacture of plastic fibers, more particularly of protein fibers and especially of fibers from protein contained in soybean.

It is an object of this invention to provide a process for manufacturing soybean fibers, improved in strength, water resistance, flexibility and softness, not shrinking and sticking in hot acid dye baths.

These objects are accomplished by the following invention, wherein a nonaqueous liquid consisting of a co-polymer of pseudo-thiohydantoin-zein, a phenolic substance and an aldehyde, dissolved in a mixture of an organic solvent and an emulsifying agent, is added to a spinning solution, prepared either from soybean protein, or from casein or from cellulose xanthogenate.

In choosing a phenolic substance for commercial purposes I recommend phenol, cresol and as organic solvents such as cyclohexanol, methylcyclohexanol, but diethylenglycol, ethylenglycol, diethylenglycol-monoethylether are also recommended. As emulsifying agent I use sulfonated castor oil, monoethanolamine. Plasticizers such as dibutyltartrate, ethyllactate, etc., may be incorporated in the organic solvent.

The applicant has discovered that a combination of soybean protein and zein, particularly a combination of soybean protein and a co-polymerization product, prepared from pseudo-thiohydantoin zein, cresol (cresylic acid), formaldehyde, has the prominent effect to improve soybean protein fibers in such a high grade, necessary to make them suitable for wool and other fibers, not known before to those skilled in the art.

The following is given to illustrate a preferred procedure for producing fibers comprising soybean protein and a co-polymer, prepared from pseudothiohydantoin-zein, a phenolic substance and an aldehyde. Proportions are given in parts by weight.

| | |
|---|---|
| Soybean protein | kg 18 |
| Water | liters 72 |
| Sodium hydroxide solution (2N) | do 10 |
| Solution of the polymer | kg 1 |

It is assumed that the chemical constitution of the polymer, respectively the unit of the co-polymer is as follows:

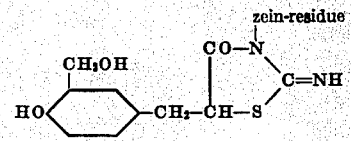

The textile soybean protein, more or less hydrolyzed, was soaked in water for 15 to 30 minutes at a temperature of 45° C. and the sodium hydroxide solution then added and the protein dissolved. This solution was warmed to 65.° C. and mixed under stirring with 1 kg. of a solution of the polymer.

| | Per cent |
|---|---|
| Polymer | 10–20 |
| Cyclohexanol | 80–40 |
| Sulfonated castor oil | 10–40 |

The polymer is obtained by dissolving 1.9 g. monochloroacetic acid and 1.7 g. ammoniumsulfocyanide, 100 g. zein in 166 g. cresylic acid, heating the mixture at 90° C. one hour, cooling and adding afterwards 175 g. 40% formalin, heating the mixture until the water and free formaldehyde is evaporated, preferably under vacuum. The polymer so obtained is then dissolved in cyclohexanol and mixed with sulfonated castor oil.

The spinning solution after permitting to mature was forced under stretching through a spinnerette into a precipitating bath as follows.

| | |
|---|---|
| Water | per cent 55 |
| Acid sulfuric | do 25 |
| Sodium sulfate | do 20 |
| Temperature | ° C 45 |

The soybean protein-zein modified fibers are afterwards thoroughly hardened in a bath as follows:

| | Per cent |
|---|---|
| Water | 95 |
| Formaldehyde | 4 |
| Sodium chloride | 1 |

The fibers are then washed and dried, using a current of air. It should be noted that since the efficiency of a good spinning process is dependent on many factors such as the nature of the soybean protein, which may be sulfonated with carbondisulfide and afterwards oxidized, and its concentration, alkalinity, viscosity etc., the above cited per cent range gives only one indication of the quantities of the polymer to be applied.

Having now particularly described and ascertained the nature of my said invention and in what manner the same is to be performed, I declare that what I claim is:

A modified soybean protein fiber, improved in strength, flexibility and water resistance, consisting of soybean protein and a copolymer consisting of pseudothiohydantoin-zein, cresylic acid and formaldehyde.

OSKAR HUPPERT.